US 6,603,740 B1

(12) United States Patent
Du

(10) Patent No.: US 6,603,740 B1
(45) Date of Patent: Aug. 5, 2003

(54) LOCAL AREA NETWORK WITH A BRIDGE TERMINAL FOR TRANSMITTING DATA BETWEEN A PLURALITY OF SUB-NETWORKS AND FOR LOOP DETECTION

(75) Inventor: Yonggang Du, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/422,371

(22) Filed: Oct. 21, 1999

(30) Foreign Application Priority Data

Oct. 21, 1998 (DE) .......................... 198 48 342

(51) Int. Cl.[7] .......................... G01R 3/08; G06F 11/00; G08C 15/00; H04J 1/16; H04J 3/14; H04L 1/00; H04L 12/26
(52) U.S. Cl. ........................ 370/248; 370/241
(58) Field of Search .................. 370/254, 255, 370/256, 248, 249, 338, 241

(56) References Cited

U.S. PATENT DOCUMENTS

| 4,706,081 A | * | 11/1987 | Hart et al. | |
| 5,504,746 A | * | 4/1996 | Meier | |
| 5,519,834 A | * | 5/1996 | Kamerman et al. | |
| 6,034,951 A | * | 3/2000 | Du | ............................ 370/328 |
| 6,122,256 A | * | 9/2000 | Berglund | |
| 6,272,120 B1 | * | 8/2001 | Alexander | .................. 370/338 |

FOREIGN PATENT DOCUMENTS

| DE | 19637026 | 4/1998 | .......... H04L/12/28 |
| DE | 19639845 | 4/1998 | ......... H04L/12/433 |

* cited by examiner

*Primary Examiner*—Ken Vanderpuye
(74) *Attorney, Agent, or Firm*—Daniel J. Piotrowski

(57) ABSTRACT

The invention relates to a local area network comprising a plurality of sub-networks and a plurality of bridge terminals, which bridge terminals are provided for transmitting data between the terminals of at least two sub-networks via a wireless medium. After a bridge terminal has been put into operation, it sends a certain number of loop test messages to all the sub-networks connected to the bridge terminal. Each bridge terminal that receives a loop test message from a sub-network passes this message on to all the other connected sub-networks. The bridge terminal that has transmitted the certain number of loop test messages detects that there is no loop when after a predefined period of time a loop test message that has been sent does not return.

2 Claims, 3 Drawing Sheets

LOCAL AREA NETWORK WITH A BRIDGE TERMINAL FOR TRANSMITTING DATA BETWEEN A PLURALITY OF SUB-NETWORKS AND FOR LOOP DETECTION

CITATION OF RELATED CASES

This application is related to U.S. patent application Ser. No. 09/422,732, entitled "Local Area Network with a Bridge Terminal for Transmitting Data between a Plurality of Sub-networks" and U.S. patent application Ser. No. 09/422, 732, entitled "Automatic Configuration of a Bridge Terminal for Transmitting Data between a Plurality of Sub-networks in a Local Area Network", both assigned to the assignee of this patent application.

BACKGROUND OF THE INVENTION

The invention relates to a local area network comprising a plurality of sub-networks and a plurality of bridge terminals, which bridge terminals are provided each for transmitting data between the terminals of at least two sub-networks via a wireless medium.

Such a local area network comprising a plurality of sub-networks is known from DE 196 37 026 A1. A sub-network contains a plurality of terminals which exchange via a radio transmission medium (wireless medium) cells generated in the asynchronous transfer mode. Data are transmitted between two sub-networks via a bridge terminal. How the transmission paths run through the bridge terminals is not further described in said document.

SUMMARY OF THE INVENTION

It is an object of the invention to provide a bridge terminal for connecting at least two sub-networks in a local area network, which bridge terminal makes unique transmission paths possible in the local area network.

The object of the invention is achieved by a local area network of the type defined in the opening paragraph
  in that a bridge terminal, after being put into operation, is provided for transmitting a certain number of loop test messages to all the sub-networks connected to the bridge terminal, in that each bridge terminal is provided for transferring a loop test message received from a sub-network to all the other connected sub-networks and
  in that the bridge terminal that has transmitted the certain number of loop test messages is provided for detecting that there is no loop when no loop test message returns after a predefined period of time.

According to the invention, a bridge terminal, after being put into operation, detects whether there is a loop in the local area network. If there is a loop in the local area network, one sub-network can receive the same data from a plurality of other sub-networks. Avoiding loops means that a sub-network can always receive data of another sub-network only from a specific bridge terminal and thus unique transmission paths are created.

The data, which are transmitted in the local area network, may have been generated in accordance with a packet transfer method. The packets may be transmitted as a whole, or as sub-packets via the wireless medium after further data have been added. A wireless medium is understood to mean a radio, infrared, ultrashell transmission etc. As a packet transfer method may be used, for example, the asynchronous transfer mode (ATM), which generates fixed-length packets which are called cells.

A bridge terminal which is put into operation first transmits a loop test message which contains, as shown in claim 4, an identification number for the bridge terminal transmitting the loop test message. A bridge terminal receiving a loop test message transfers this loop test message. When the bridge terminal that has transmitted a loop test message does not receive this message back after a predefined period of time, there is a loop. As described in claim 2, this loop test message may be transmitted a number of times for reasons of reliability. Random time intervals then occur between the respective transmission instants.

Claim 3 describes that a bridge terminal, once a loop has been detected, is not provided for transmitting data between the connected sub-networks.

In order not to load the local area network unnecessarily with false messages, a bridge terminal inserts a zeroed sub-net count into the loop test message. The evaluation of the sub-net count is defined in claim 5.

The invention further relates to a bridge terminal of a local area network including a plurality of sub-networks and further bridge terminals for transmitting data between the terminals of at least two sub-networks via a wireless medium.

BRIEF DESCRIPTION OF THE DRAWINGS

These and other aspects of the invention are apparent from and will be elucidated with reference to the embodiments described hereinafter.

In the drawings.

DETAILED DESCRIPTION OF THE PREFERRED EMBODIMENTS

Figure 1:
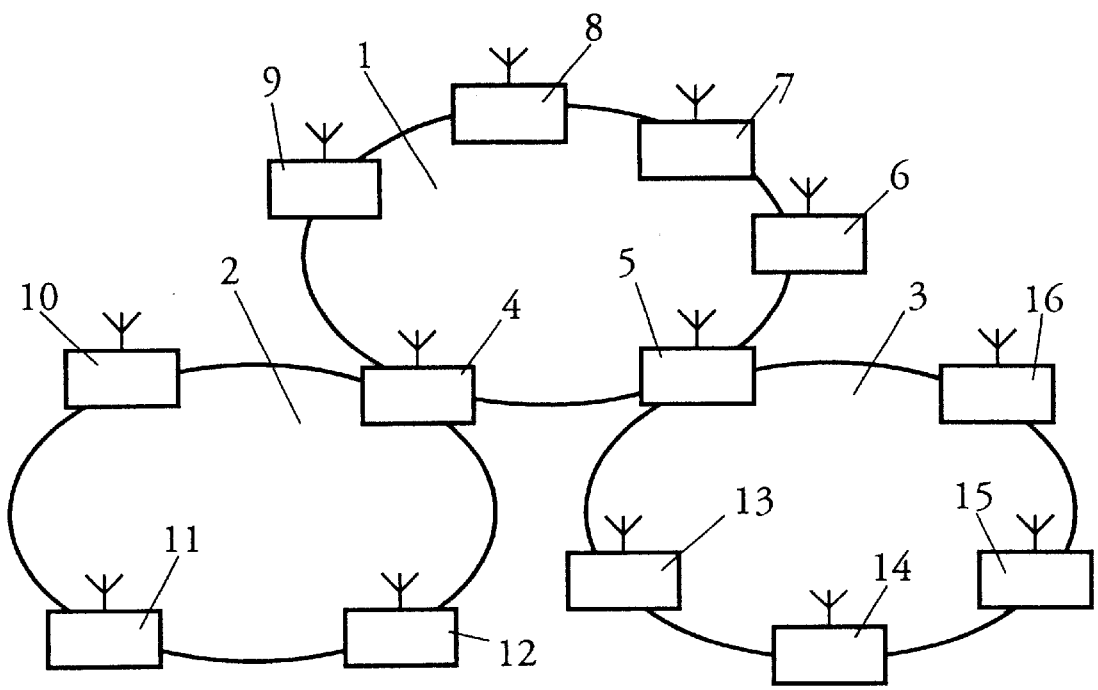
FIG. 1 shows a local area network with three sub-networks which have each terminals provided for radio transmission.

FIG. 1 shows an example of embodiment of a local area network operating in the synchronous transfer mode (ATM) having three sub-networks 1 to 3 which have each a plurality of terminals 4 to 16. Part of the sub-network 1 is formed by the terminals 4 to 9, of the sub-network 2 by the terminals 4 and 10 to 12 and of the sub-network 3 by the terminals 5 and 13 to 16. The terminals belonging to a respective sub-network exchange data via radio links. The ellipses shown in FIG. 1 denote the radio coverage area of a sub-network (1 to 3) in which radio transmission to the terminals belonging to the sub-network is possible largely without any problems.

The terminals 4 and 5 are called bridge terminals, because they make a data exchange possible between two sub-networks 1 and 2 and 1 and 3 respectively. The bridge terminal 4 is responsible for the data traffic between the sub-networks 1 and 2 and the bridge terminal 5 for the data traffic between the sub-networks 1 and 3.

A sub-network 1 to 3 of the local area network may be, for example, an ad hoc network, which is formed by terminals of subscribers sitting around a table, which terminals are connected by radio. Such terminals may be, for example, communication devices for the wireless exchange of documents, pictures and so on. An ad hoc network is characterized in that the structure and the number of subscribers are not laid down within predefined limit values. For example, a communication device of a subscriber can be removed from the network or included therein.

Figure 2:
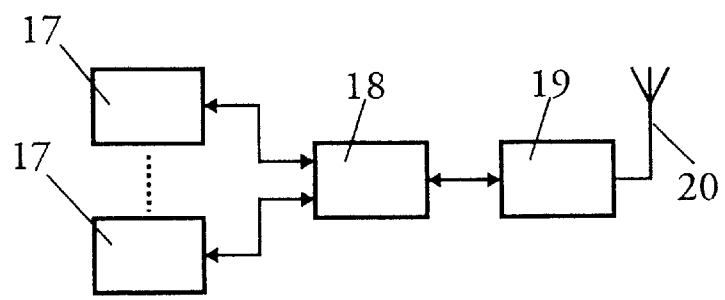
FIG. 2 shows a terminal of the local area network shown in FIG. 1.

A terminal 4 to 16 of the local area network shown in FIG. 1 may be a mobile or fixed communication device and comprises, for example, at least a station 17, a connection control device 18 and a radio device 19 with antenna 20, as shown in FIG. 2. A station 17 may be, for example, a portable computer, a telephone and so on. The connection control device 18 is known, for example, from document DE 196 39 845 C1 and is used for switching ATM connections (virtual connections) and for distributing ATM cells. A cell typically contains a header field of 5 bytes and an information field of 48 bytes. The data contained in the header field of the cell are particularly used for addressing and executing switching functions. Cells may be generated by a controller included in the connection control device 18 and by a station 17 and received by the radio device 19.

A virtual connection to a station 17 of a second terminal desired by, for example, a station 17 of a first terminal is formed by the connection control devices 18 of the first and second terminals. This is a unicast connection then. With a unicast connection, or end-to-end connection, there is a virtual connection of a user (for example, a program running on a portable computer) of a first terminal to a user (for example, database accessed by the program) of a second terminal. Two more types of connection may be distinguished. With a multicast connection or point-to-multipoint connection, a plurality of users of terminals are interconnected. In the case of the broadcast connection, a user of a terminal delivers cells having the same contents in the information field to all other users of the terminals.

Figure 3:
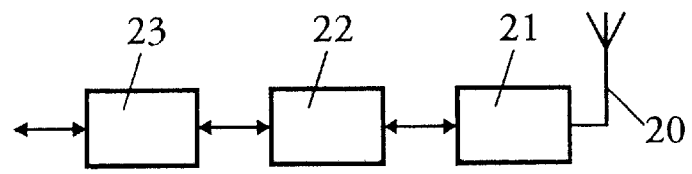
FIG. 3 shows a radio device of the terminal shown in FIG. 2, FIGS. 4 and 5 show two embodiments for a bridge terminal for connecting two sub-networks.

A radio device 19 of the terminals 6 to 16 is also known from the document DE 196 39 845 C1 and includes, as shown in FIG. 3, in addition to the antenna 20, a high-frequency circuit 21, a modem 22 and a protocol device 23. The protocol device 23 forms packet units from the ATM cell stream received by the connection control device 18. A packet unit contains at least parts of an ATM cell and additional control data formed by the protocol device 23. The protocol device uses protocols for the LLC layer (LLC=Logic Link Control) and the MAC layer (MAC=Medium Access Control). The MAC layer controls the multiple access of a terminal to the radio transmission medium and the LLC layer performs a flow and error control.

In a sub-network 1 to 3, a certain terminal is responsible for the control and management functions and is called a controller. The controller further works as a normal terminal in the associated sub-network as this is described, for example, in DE 196 39 845 C1. The controller is responsible for, for example, the registration of terminals that are switched on in the sub-network, the connection set-up between at least two terminals in the radio transmission medium, the resource management and the access control in the radio transmission medium. For example, after the registration and after the announcement of a request for transmission, a terminal of a sub-network is assigned data transmission capacity (packet units) by the controller.

In the local area network, the data can be exchanged between the terminals according to a TDMA, FDMA or CDMA method (TDMA=Time-Division Multiple Access, FDMA=Frequency-Division Multiple Access, CDMA=Code-Division Multiple Access). The methods may also be combined. Each sub-network 1 to 3 of the local area network is assigned a number of certain channels which are referenced a channel group. A channel is determined by a frequency range, a time range and, for example, in the CDMA method, by a spreading code. For example, a certain ever different frequency range from $f_i-\Delta f_i/2$ to $f_i+\Delta f_i/2$, where $f_i$ is a carrier frequency and $\Delta f_i$ is the bandwidth, may be rendered available for data exchange to each sub-network 1 to 3. In such a frequency range, for example, data can be transmitted with the TDMA method. The carrier frequency $f_1$ and the bandwidth $\Delta f_1$ may then be assigned to the sub-network 1, the carrier frequency $f_2$ and the bandwidth $\Delta f_2$ to the sub-network 2 and the carrier frequency $f_3$ and the bandwidth $\Delta f_3$ to the sub-network 3. The bridge terminal 4 operates, on one hand, to carry out a data exchange with the other terminals of the sub-network 1, in the frequency range from $f_1-\Delta f_1/2$ to $f_1+\Delta f_1/2$ and, on the other, to carry out a data exchange with the other terminals of the sub-network 2, in the frequency range from $f_2-\Delta f_2/2$ to $f_2+\Delta f_2/2$. The second bridge terminal 5 included in the local area network, which terminal transmits data between the sub-networks 1 and 3, operates, on one hand, in the frequency range from $f_1-\Delta f_1/2$ to $f_1+\Delta f_1/2$ and, on the other, in the frequency range from $f_3-\Delta f_3/2$ to $f_3+\Delta f_3/2$.

Figure 4:
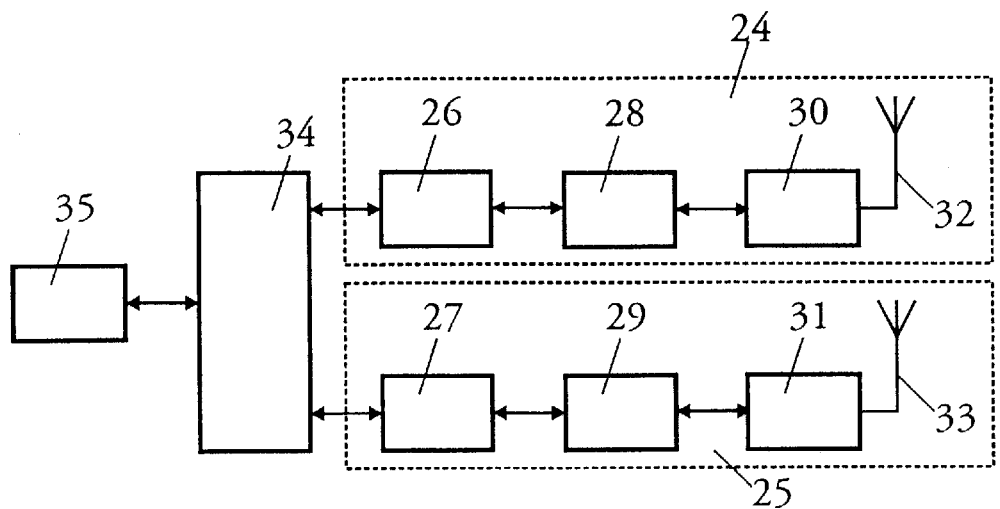

A block diagram of a first example of embodiment of a bridge terminal is shown in FIG. 4. The bridge terminal includes a first radio circuit 24 for communication with the terminals of a first sub-network and a second radio circuit 25 for communication with the terminals of a second sub-network. The radio circuits 24 and 25, which form a radio device, contain each a protocol device 26, 27, a modem 28, 29 and a high-frequency circuit 30, 31 as well as an antenna 32, 33 respectively. A radio switching device 34 is coupled, on one hand, to the two radio circuits 24 and 25 and on the other to a connection control device 35. One or various stations connected to the connection control device 35 are not shown in FIG. 4. Via the antenna 32 of the radio circuit 24, data are transmitted in a first channel group and via the antenna 33 of the radio circuit 25 data are transmitted in a second channel group.

Data coming from the connection control device 35 are conveyed to the protocol device 26 and/or 27 by the radio switching device 34 in dependence on address information. Furthermore, the radio switching device 34 conveys data from a protocol device 26 or 27 to the connection control device 35 and/or to the respective other protocol device 26 or 27. When at least one station is connected to the connection control device 35, the bridge terminal is used not only for exchanging data between two sub-networks, but also operates as a normal terminal. The advantage of this first example of embodiment is that data can be exchanged with the sub-networks any time.

It is alternatively possible that a bridge terminal includes more than two radio circuits 24 and 25, actually when the bridge terminal connects more than two sub-networks. The number of the radio circuits then corresponds to the number of the sub-networks to be combined.

Figure 5:
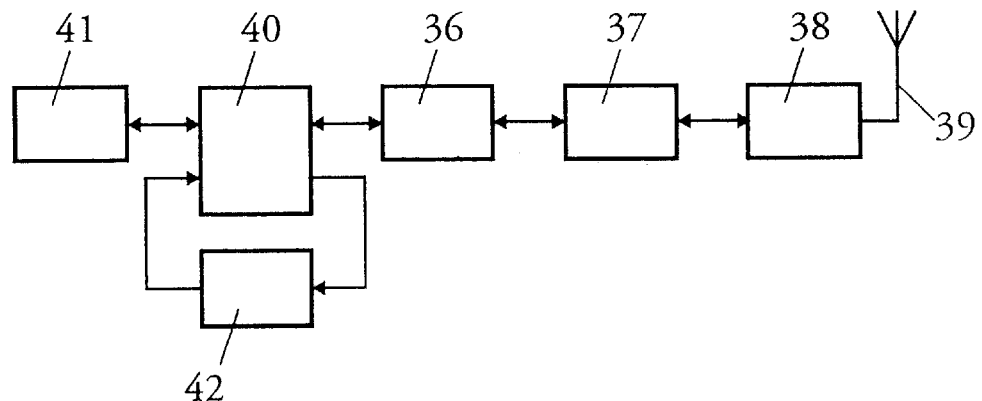

A block diagram of a second example of embodiment of a bridge terminal is represented in FIG. 5. The radio switching device of this bridge terminal includes only a single protocol device 36, a single modem 37 and a single high-frequency circuit 38 with an antenna 39. The protocol device 36 is connected to a radio switching device 40 which is further connected to a connection control device 41 and to an intermediate store 42. The intermediate store 42 in this embodiment includes a storage cell and is used for buffering data and is also arranged as a FIFO module (First In First Out), that is, the data are read from the intermediate store in the order in which they have been written. The terminal shown in FIG. 5 can also operate as a normal terminal. Stations connected to the connection control device 41 and which are not shown in FIG. 5 then supply data to the radio switching device 40 via the connection control device 41.

The bridge terminal shown in FIG. 5 is alternately synchronized with a first and a second sub-network. Synchronization is to be understood as the aggregate process from the inclusion of a terminal in the sub-network to the exchange of data. When the bridge terminal is synchronized with the first sub-network, it can exchange data with all the terminals and with the controller of this first sub-network. If the connection control device 41 supplies data to the radio switching device 40, of which data the destination is a terminal or the controller of the first sub-network, or the terminal or controller of another sub-network that can be reached via the first sub-network, the radio switching device conveys these data directly to the protocol device 36. In the protocol device 36, the data are buffered until the transmission time slot determined by the controller is reached. When the data produced by the connection control device 41 are to be sent to a terminal, or to the controller of the second sub-network, or to another sub-network to be reached via the second sub-network, the radio transmission is to be delayed until the time slot in which the bridge terminal is synchronized with the second sub-network. Consequently, the radio switching device conveys the data whose destination lies in the second sub-network or whose destination can be reached via the second sub-network, to the intermediate store 42 which buffers the data until the bridge terminal is synchronized with the second sub-network.

When data are received from a terminal or from the controller of the first sub-network by the bridge terminal, and whose destination is a terminal or the controller of the second sub-network or a terminal or controller of another sub-network to be reached via the second sub-network, these data are also buffered in the intermediate store 42 until the synchronization with the second sub-network. Data whose destination is a station of the bridge terminal are directly transferred to the connection control device 41 via the radio switching device 40, which control device then conveys the received data to the desired station. Data whose destination is neither a station of the bridge terminal nor a terminal or a controller of the second sub-network, are erased by the radio switching device 40. Also data that are no longer to be conveyed via the second sub-network are erased.

After the change of synchronization of the bridge terminal from the first to the second sub-network, the data present in the intermediate store 42 are again read from the intermediate store 42 in the order in which they have been written. Subsequently, during the synchronization of the bridge terminal with the second sub-network, all the data whose destination is a terminal or the controller of the second sub-network or another sub-network to be reached via the second sub-network, are immediately transferred to the protocol device 36 by the radio switching device 40 and only the data whose destination is a terminal or the controller of the first sub-network, or another sub-network to be reached via the first sub-network, are stored in the intermediate store 42.

It is not absolutely necessary that data meant for terminals or the controller of the first sub-network are stored in the intermediate store 42 only when all the other data have been read out. The data are buffered in the protocol device 36 until the time slot provided for the transmission.

The buffering of the data for the first sub-network may already be effected while the data for the second sub-network are being read out. It is only to be ensured that the newly stored data for the first sub-network are buffered until the bridge terminal is synchronized with the first sub-network. When the bridge terminal is connected to the first sub-network, it is also possible to buffer the data intended for the second sub-network while the reading process for the data of the first sub-network from the intermediate store 42 is being performed.

The knowledge of the radio switching device 40 (or also of the radio switching device 34 in FIG. 4) about the destination of the received data is taken, for example, from address information from the data. This address information is, for example, the identification number of a terminal. When the destination of data arriving at the radio switching device 40 is a station of the bridge terminal, or a terminal or controller of a sub-network, the radio switching device falls back upon, for example, data for comparison which are stored in a table memory connected to the radio switching device. The table memory contains data for comparison from which the radio switching device derives where received data are to be transported to. After a terminal has been registered in a sub-network, the terminal sends out a broadcast message, which contains the identification number of the terminal. A bridge terminal receiving this broadcast message stores in the table memory the identification number and, for example, a number for featuring the bridge-terminal-connected sub-network from which the broadcast message originates. Data, supplied to the bridge terminal, for example, by another sub-network and which contain the identification number of the terminal as address information, are then transported to the sub-network from which the broadcast message originates.

The table memory further contains data for comparison of the connection control device 41 for the stations connected to the bridge terminal, so that certain incoming data can be applied to the connection control device of the bridge terminal. A bridge terminal that receives the broadcast message is to convey this broadcast message to the respective other sub-network.

When data arrive at the radio switching device 40, the address information of the data is compared to the data for comparison. In dependence on the comparison, the radio switching device performs the respective switching operations. For example, data from the terminal 14 of the sub-network 3 in FIG. 1 should reach the terminal 11 via the bridge terminal 5, the sub-network 1 and the bridge terminal 4. The bridge terminal 5 is to contain data for comparison in its table memory, which indicate that the data are to reach sub-network 2 via the sub-network 1. Such data for comparison have been stored, for example, in the bridge terminals 4 and 5 after the terminal 14 has been registered in the sub-network 3. The terminal 14 sends out a broadcast message after the registration, which message contains the identification number of the terminal. When the bridge terminals 4 and 5 receive this broadcast message, it is to store data for comparison for this terminal in the table memory. Subsequently, this broadcast message is further transported by the bridge terminal 4, 5 respectively and thus distributed over the whole local area network. If a terminal or controller receives such a broadcast message, the message is erased. The broadcast message is further complemented by the addition of the identification number of the bridge terminal passed through by the broadcast message. This achieves that a bridge terminal receiving the broadcast message of a terminal for the second time needs no longer process this broadcast message, but is to erase it.

The advantage of using only a single radio circuit with a protocol device 36, modem 37 and high-frequency circuit 38 for a bridge terminal consists of, on the one hand, avoiding a further radio circuit having costly components and, on the other hand, avoiding the use of filters for suppressing crosstalk of two radio circuits. If the bridge terminal having one radio circuit is to connect more than two sub-networks, further memory elements will be necessary in the intermediate store and further time slots are to be provided for synchronization with a sub-network. If the bridge terminal is to connect M sub-networks (M∈N, M≧2), the number of memory locations in the intermediate store and the number of time slots are to be at least M−1. Advantageously, the number of storage cells should be set to M, so that in case of a change of the connection of two sub-networks, the data are always written in the same storage cell. This simplifies the control of the writing and reading process in or from respectively, the memory locations of the intermediate store.

When all the bridge terminals connecting two sub-networks in the local area network are distributed so that there are no loops, the transfer of the data in a bridge terminal may be simplified. A loop means that a sub-network can always receive data from other sub-networks from more than one bridge terminal. When the bridge terminal receives data from a terminal or from the controller of a first sub-network, and the destination of which data can be reached via the second sub-network, the radio switching device 34 or 40 directly (example of embodiment as shown in FIG. 4) or after buffering (example of embodiment as shown in FIG. 5) sends data to the second sub-network. Data sent by a terminal or the controller of the first sub-network, having a station of the bridge terminal for their destination, are switched by the radio switching device 34 or 40 to the connection control device 35 or 41 and from there to the desired station. Data received from a terminal or from the controller of the first sub-network, which data have a terminal or controller of the first sub-network for their destination, or which are not to be transported by the bridge terminal, are erased by the radio switching device.

If the bridge terminal receives data from a terminal or from the controller of the second sub-network, the destination of which data can be reached via the first sub-network, these data will be sent directly (example of embodiment as shown in FIG. 4) or after buffering (example of embodiment as shown in FIG. 5) to the first sub-network. Data sent by a terminal or the controller of the second sub-network, which data have a station of the bridge terminal for their destination, are transferred by the radio switching device 34 or 40 to the connection control device 35 or 41 and from there to the desired station. Data received by a terminal or the controller of the second sub-network, which data have a terminal or the controller of the second sub-network for their destination and which cannot be transferred by the bridge terminal, are erased by the radio switching device.

A bridge terminal that connects only two sub-networks and is included in a local area network without a loop being formed, does not need extra signaling information for transferring the data. If the destination of the data can be reached via the sub-network from which the data originate, these data are erased. Data whose destination can be reached via the respective other sub-network are transferred to that other sub-network. This means that a bridge terminal is only to know via which of the two connected networks the receiver of the data can be reached. Knowledge about the actual destination of the receiver and the transmission paths to this destination is not necessary.

Figure 6:
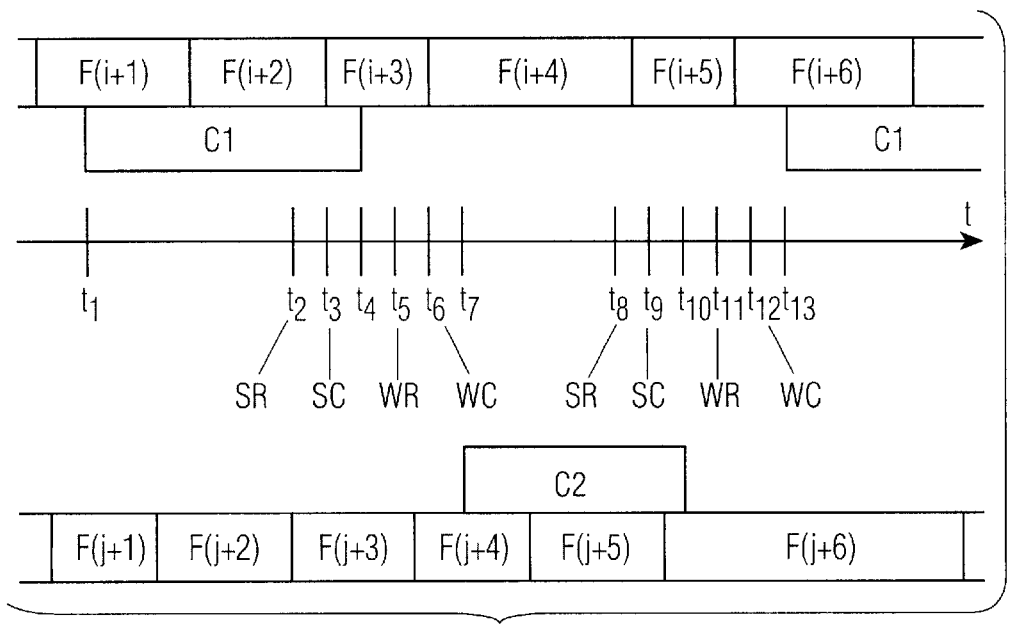
FIG. 6 shows a timing diagram in explanation of the synchronization of a bridge terminal shown in FIG. 5 with two sub-networks.

In the following is explained with reference to FIG. 6 and as a function of time, the synchronization of a bridge terminal as shown in FIG. 5 with a first and a second sub-network. Frames of the MAC layer (MAC frames) of the first and second sub-networks are plotted against time. The successive MAC frames of the first sub-network are referenced F(i+1), F(i+2), . . . , F(i+6) in FIG. 6 and those of the second sub-network F(j+1), F(j+2), . . . F(j+6). The duration of the synchronization or connection of the bridge terminal to the first sub-network is referenced C1 and the duration of the synchronization or connection to the second sub-network is referenced C2. The respective frames F(i+1), F(i+2), . . . , F(i+6) and F(j+1), F(j+2), . . . , F(j+6) may have different durations.

Various instants $t_1, t_2, \ldots, t_{13}$ are plotted on the time axis t. In the example shown in FIG. 6, the synchronization or connection of the bridge terminal begins at instant $t_1$ during the frame F(i+1) and ends at an instant $t_4$ during the frame F(i+3). During this time period, from instant $t_1$ to instant $t_4$, the bridge terminal is in an active mode for the first sub-network and in a sleep mode for the second sub-network. During the sleep mode there is no connection from the bridge terminal to a sub-network. Before the active mode of the first sub-network has ended, the bridge terminal sends a sleep request message SR to the controller of the first sub-network at instant $t_2$ ($t_2 < t_4$). This sleep request message SR contains a proposal for the instant at which the sleep mode begins or the active mode ends (instant $t_4$) and an indication for the duration of the sleep mode. The controller of the first sub-network acknowledges the sleep request at an instant $t_3$ ($t_2 < t_3 < t_4$) by sending a sleep confirmation message SC. The sleep confirmation message SC indicates the exact instant at which the sleep mode begins. The controller acknowledges here the start instant $t_4$ of the sleep mode of the bridge terminal for the first sub-network.

After the instant $t_4$, the bridge terminal tries to synchronize with the second sub-network. The synchronization is then carried out via the controller of the second sub-network. The bridge terminal receives from the controller of the second sub-network all the necessary system and synchronization information for realizing a data exchange with the terminal of the second sub-network. After the synchronization, the bridge terminal sends a wake-up request message WR to the controller of the second sub-network at an instant $t_5$ during the frame F(j+3) of the second network. This wake-up request message WR contains a proposal for the beginning of the active mode of the bridge terminal with the second sub-network and an indication of the duration of the active mode. The controller responds to this wake-up request message WR at an instant $t_6$ with a wake-up confirmation message WC, which indicates the exact instant at which the active mode begins. At an instant $t_7$ ($t_6 < t_7$), the active mode of the bridge terminal with the second sub-network begins and thus the data exchange, as appropriate, with the terminals of the second sub-network.

The above-described process for the termination of the active mode of the first sub-network, or the beginning of the sleep mode of the bridge terminal with the second sub-network respectively, is carried out at instant $t_8$ with a sleep request message SR for the second sub-network. At instant $t_9$, the bridge terminal receives a wake-up confirmation message from the controller of the second sub-network and the active mode of the bridge terminal with the second sub-network ends at instant $t_{10}$. Subsequently, the bridge terminal again synchronizes with the controller of the first sub-network and sends a wake-up request message WR to the controller of the first sub-network at instant $t_{11}$ after the synchronization. At the instant $t_{12}$, the bridge terminal receives the wake-up confirmation message WC and starts the communication with the terminals of the first sub-network at instant $t_{13}$.

For the formation of the various messages, the protocol device 36 includes, for example, a control device arranged as a microprocessor. The protocol device 36 is responsible for, as discussed above, the MAC and LLC layer and, as the case may be, further control operations of the radio transmission medium (compare DE 196 39 845 C1).

In the previous paragraphs, the structure of a local area network having a plurality of sub-networks and of a bridge terminal connecting the plurality of sub-networks has been explained. The following describes the automatic configuration of one or more bridge terminals, which perform their operations in a local area network.

If a bridge terminal in a local area network connects more than two sub-networks, it is either necessary to determine which sub-networks the bridge terminal is to connect, or an automatic configuration may be started. With the automatic configuration, the bridge terminal first tests which sub-networks can be reached and which channel group is used by the sub-networks that can be reached. Using a channel group in a sub-network is understood to mean that a certain channel group is used by the terminals and the controller of this sub-network for transmitting data. For each available channel group in the local area network, the bridge terminal tests the receiving quality. This means that the bridge terminal attempts to synchronize with a controller of a sub-network. After the synchronization, control data of the controller demodulated by the high-frequency circuit and the modem, are decoded by the protocol device of the bridge terminal and evaluated to check the quality.

All the channel groups used by the sub-networks are referenced active channel groups $k_1, k_2, \ldots k_p$. The protocol device of the bridge terminal, which terminal is to connect two sub-networks, establishes a list of all the possible active channel group pairs $(k_i, k_j)$, where $k_i \neq k_j$. If, for example, four active channel groups $k_1$, $k_2$, $k_3$ and $k_4$ have been detected, the channel group pairs $(k_1, k_2)$, $(k_1, k_3)$, $(k_1, k_4)$, $(k_2, k_3)$, $(k_2, k_4)$ and $(k_3, k_4)$ are formed. These channel group pairs are then sorted according to a certain criterion. For example, for each channel group pair may be formed the sum of the received average energy values of the assigned sub-networks. The modem then measures for each data bit the determined energy and supplies this to the protocol device, which calculates the average energy value after various bits have been received.

The channel group pairs are sorted in accordance with a descending order of the calculated sum. This means that the first channel group pair has a larger sum than the second channel group pair, the second channel group pair a larger sum than the third channel group pair, and so on. Alternatively, it is possible for each channel group pair to determine the receiving quality of a control message of the assigned sub-networks sent by the controller and to sort the channel group pairs in accordance with the descending order of the receiving quality. The receiving quality may be determined, for example, by the protocol device on the basis of the bit error rate of the received signal. In present-day terminals such bit error measurements are made during the channel coding. The bridge terminal then connects the two sub-networks to the channel groups of the first channel group pair of the sorted list.

Figure 7:
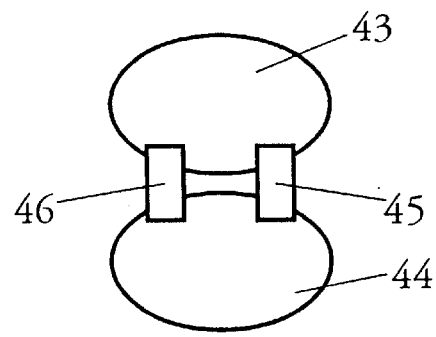
FIGS. 7 to 9 show a plurality of sub-networks connected via bridge terminals and forming undesired loops.
Figure 8:
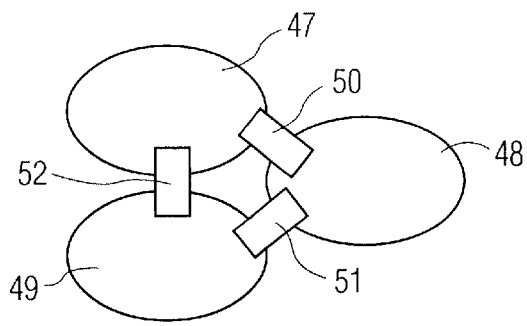
Figure 9:
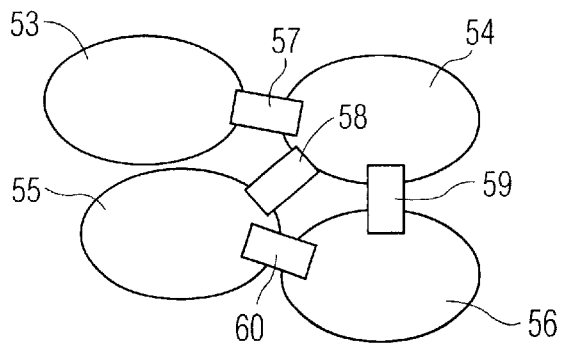

As explained above, a bridge terminal can effect an automatic configuration to determine which sub-networks are to be connected. There is a further possibility, which is fixedly predefined, which sub-networks are connected by a bridge terminal. After a bridge terminal has been made operative in accordance with either indicated method (automatic or predefined configuration), there may further be tested whether a loop has been formed in the whole local area network. As discussed above, an avoidance of loops means that one sub-network can receive data from another sub-network only from a certain bridge terminal. FIGS. 7, 8 and 9 represent each local area networks having a plurality of sub-networks which contain loops. FIG. 7 shows two sub-networks 43 and 44 which are connected via two bridge terminals 45 and 46. The bridge terminals 45 and 46 connect two sub-networks each. In this local area network, data can be transmitted between the sub-networks 43 and 44 via the two bridge terminals 45 and 46. A loop is thus formed between the sub-networks 43 and 44.

FIG. 8 shows a local area network having three sub-networks 47 to 49. A bridge terminal 50 connects the sub-networks 47 and 48, a bridge terminal 51 connects the sub-networks 48 and 49 and a bridge terminal 52 connects the sub-networks 47 and 49. In this local area network, for example, the sub-network 47 can receive data from the sub-network 48 via the bridge terminal 50 or via the bridge terminals 51 and 52 and the sub-network 49.

FIG. 9 shows four sub-networks 53 to 56. The sub-network 53 is connected to the sub-network 54 via the bridge terminal 57 and the sub-network 54 to the sub-network 55 via the bridge terminal 58 and to the sub-network 56 via the bridge terminal 59. A bridge terminal 60 further connects the sub-networks 55 and 56. Also with the local area network shown in FIG. 9, a loop is formed with the bridge terminals 58 to 60.

If such a formation of a loop were permitted, there would be no unambiguous transmission path between a terminal that transmits data and a terminal that receives data. In this case, information should then be available to any receiver via the transmission paths. For example, in the local area network shown in FIG. 8 there should be determined that a terminal of the sub-network 47 transmits its data via the bridge terminal 50 to a terminal of the sub-network 48 and not via the bridge terminals 51 and 52 and the sub-network 49 to the terminal of the sub-network 48. This additional information transport, however, may be avoided when no loops are formed.

The following describes how it is detected whether a loop has been formed, for example, after a channel group pair $(k_i, k_j)$ has been selected and after the resultant connection of the sub-networks by the channel groups $k_i$ and $k_j$ via the bridge terminal to be tested. The bridge terminal to be tested (test is made by a protocol device 36) sends a loop test message to the two sub-networks to which the bridge terminal to be tested is connected. The loop test message contains an identification number ID that features the bridge terminal to be tested and a sub-network count HC, which is set to 0. After the loop test message has been transmitted, a time counter TC is started.

A loop test message is processed by only one bridge terminal. When a bridge terminal receives a loop test message that does not contain the identification number of the bridge terminal receiving the loop test message, the bridge terminal increments the sub-network count HC (HC=HC+1) and checks whether the sub-net count HC exceeds a stored system parameter TS. The stored system parameter HC indicates the maximum permissible number of sub-networks of the local area network. When the sub-network count HC exceeds the system parameter TS (HC>TS), the loop test message is erased in order not to burden the local area network unnecessarily with possibly false messages. Alternatively, the loop test message is supplied to the other sub-network of the bridge terminal. By means of the sub-network count HC there is avoided that a loop test message flows around through the local area network for ever and ever; as a result of transmission errors due to a false message.

When a bridge terminal receives a loop test message transmitted by itself, i.e. the loop test message contains the bridge terminal's own identification number, there is a loop.

If the automatic configuration of a bridge terminal that operates in the local area network is realized under the condition that no loop occurs, the configuration will not be terminated if a loop is found. In that case the automatic configuration is to be carried through by finding two channel groups that have the channel group pair that lies closest by in the list.

If, within a specific period of time, a loop test message transmitted to the bridge terminal to be tested is not returned, that is, the time count TC exceeds a predetermined value, the terminal to be tested will detect that there is no loop. For reliability, the loop test may be carried out several times after random time intervals. Only when all the tests are successful will the configuration be terminated.

Thus, when it has been detected that a loop test has not been successful, the next channel group pair of the sorting list is selected and the loop test is carried out for this pair. This is continued until a loop test has been successful or until all the channel group pairs have been tested. In that case the bridge terminal cannot be used, or its location is shifted to start a new automatic configuration.

What is claimed is:

1. A local area network comprising a plurality of sub-networks and a plurality of bridge terminals, which bridge terminals are provided each for transmitting data between the terminals of at least two sub-networks via a wireless medium, wherein one of said plurality of bridge terminals, after being put into operation, is provided for transmitting a certain number of loop test messages to all the sub-networks connected to the bridge terminal, in that each bridge terminal of said plurality of bridge terminals is provided for transferring a loop test message received from a sub-network to all the further connected sub-networks and in that the bridge terminal that has transmitted the certain number of loop test messages is provided for establishing that there is no loop when no loop test message comes back after a predefined period of time, wherein one of the plurality of bridge terminals is operable for providing the functionality selected from the group consisting of (1) transmitting, after being put into operation, a plurality of loop test messages and in that there are random time intervals between the respective transmission instants of the loop test messages, (2) not transmitting, once a loop has been detected, data between the connected sub-networks, (3) inserting into a loop test message an identification number featuring the bridge terminal and (4) inserting a zeroed sub-net count and when a bridge terminal of the plurality of bridge terminals receives a loop test message it increments the sub-net count in the loop test message and erases the loop test message when the sub-net count exceeds a predefined parameter.

2. A bridge terminal for use in a local area network, which network has a plurality of sub-networks and further bridge terminals for transmitting data between the terminals of at least two sub-networks via a wireless medium, the bridge terminal comprising:

a processor configured to (1) transmit a certain number of loop test messages to all the sub-networks connected to the bridge terminal, (2) transmit a loop test message received from a sub-network to all the further connected sub-networks and (3) determine that there is no loop when no loop test message comes back after a predefined period of time wherein one of the bridge terminals is operable for providing the functionality selected from the group consisting of (1) transmitting, after being put into operation, a plurality of loop test messages and in that there are random time intervals between the respective transmission instants of the loop test messages, (2) not transmitting, once a loop has been detected, data between the connected sub-networks, (3) inserting into a loop test message an identification number featuring the bridge terminal and (4) inserting a zeroed sub-net count and when a bridge terminal receives a loop test message it increments the sub-net count in the loop test message and erases the loop test message when the sub-net count exceeds a predefined parameter.

* * * * *